Dec. 23, 1952     W. H. McKISSICK ET AL     2,622,946
RETAINING MEANS FOR IDLER UNITS
Filed Dec. 12, 1950
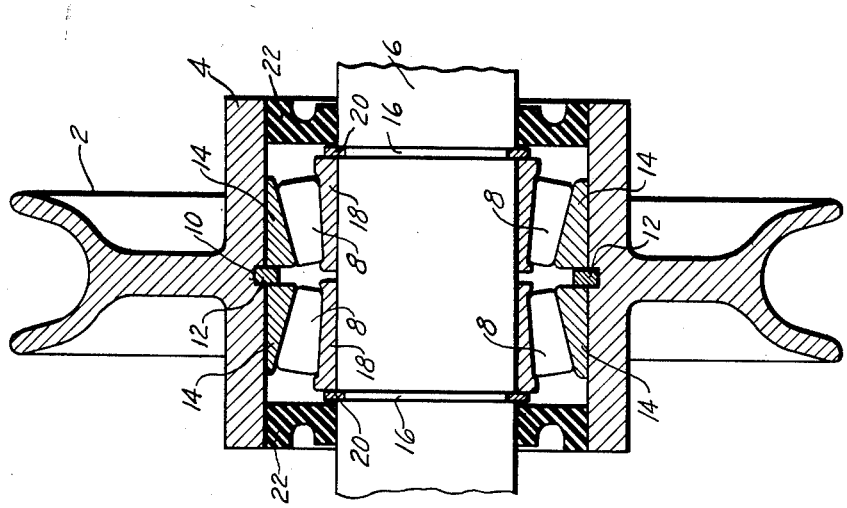
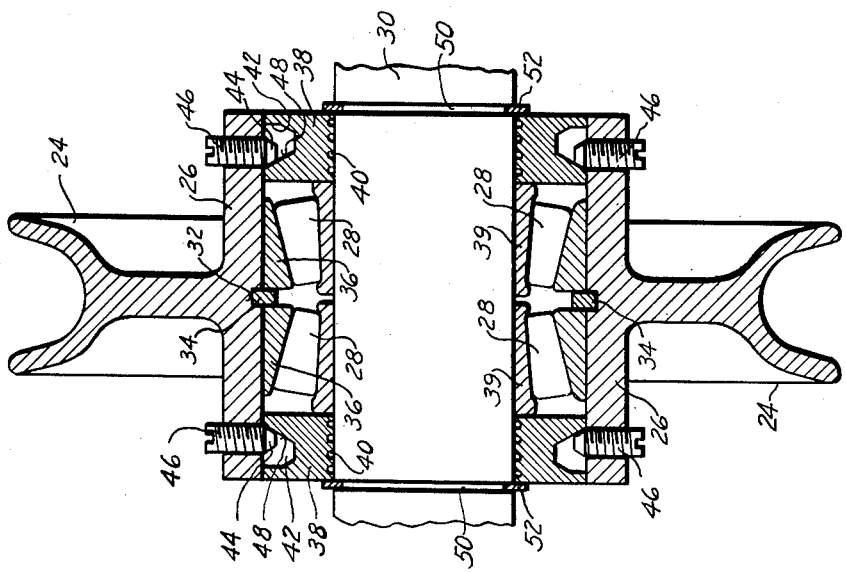
INVENTOR.
W. H. McKissick &
J. E. Fate, Jr.
BY
C. M. McKnight
ATTORNEY Patented Dec. 23, 1952

2,622,946

UNITED STATES PATENT OFFICE 2,622,946

RETAINING MEANS FOR IDLER UNITS

William H. McKissick and Jessee E. Fate, Jr., Tulsa, Okla., assignors to McKissick Products, Tulsa, Okla., a corporation of Oklahoma Application December 12, 1950, Serial No. 200,444

2 Claims. (Cl. 308—211)

This invention relates to a method of retaining an idler unit in a predetermined axial position on a shaft, and a combination idler unit and locking apparatus.

It is well known that idler units such as idler gears, pulleys and sheaves will tend to crawl along a shaft during operation. The rope or chain being used with the idler unit will frequently place an off center pull on the unit to place a side thrust on the unit and aggravate the crawling tendency thereof. The most common method of maintaining an idler unit in the desired axial position is by securing a stop collar or the like to the shaft on each side of the unit in close relationship with the opposite ends of the idler unit hub. During rotation, of the idler unit, one end of the idler unit hub will contact one of the stop collars when a side thrust is placed on the unit. Since the stop collars are stationary, and the construction materials used in the stop collars and the idler units are not adapted to be used as bearings, the idler units are often placed in a bind to decrease the efficiency thereof, and the units are sometimes broken.

The present invention contemplates a novel method of retaining an idler unit and the bearings therefor in the desired axial position on a shaft, wherein the idler unit bearing is removably secured to the supporting shaft and the idler unit hub is in turn secured to the bearing unit.

This invention also contemplates a combination idler unit and locking apparatus for retaining the idler unit in a predetermined axial position on a supporting shaft. A pair of snap rings are carried by the shaft to prevent outward movement of the idler bearing units and a snap ring is carried by the idler unit hub between the bearing units to prevent inward movement of the bearing units and to prevent axial movement of the idler unit on the bearing units.

An important object of this invention is to provide a method of retaining an idler unit in a predetermined axial position on a supporting shaft.

Another important object of this invention is to provide a method of retaining an idler unit in a predetermined axial position on a supporting shaft whereby the idler unit will not be impaired or damaged when a side thrust is placed thereon.

A further object of this invention is to increase the efficiency of operation of idler units.

A still further object of this invention is to extend the service life of idler units and the bearings therefor.

An additional object of this invention is to provide a practical and economical method of retaining an idler unit in a predetermined axial position on a supporting shaft.

Other objects and advantages of the invention will be evident from the following detailed description, read in conjunction with the accompanying drawings, which illustrate our invention.

In the drawings:

Figure 1 is a sectional view of an idler sheave secured in a predetermined position on a supporting shaft.

Figure 2 is a sectional view of another idler sheave secured in a slightly different manner on a supporting shaft.

Referring to the drawings in detail, and particularly Fig. 1, reference character 2 designates a typical wire line or rope sheave having a cylindrically shaped hub 4. The sheave 2 is supported on a stationary shaft 6 by a pair of roller bearing units 8 disposed in the hub 4. A circumferential groove 10 is provided in the inner surface of the hub 4 in the central portion thereof for receiving a suitable snap ring 12. The snap ring 12 is disposed in contact with the adjacent ends of the outer rotatable bearing races 14 of the roller bearing units 8. The outer bearing races 14 are tightly fitted in the hub 4 and rotate simultaneously with the sheave 2.

Circumferential grooves 16 are provided in the shaft 6 adjacent the outer ends of the inner stationary bearing races 18 of the bearing units 8. A suitable snap ring 20 is disposed in each circumferential groove 16 in contact with the outer end of the adjacent bearing race 18. The bearing races 18 are tightly disposed on the shaft 6. A suitable grease seal 22 is provided in each end of the hub 4 in contact with the shaft 6 in the usual manner.

It will be readily apparent that the snap ring 12 prevents inward movement of the outer bearing races 14 relative to the hub 4 as well as axial movement of the sheave 2 on the races 14. The snap rings 20 prevent outward movement of the inner bearing races 18 on the shaft 6. Since both of the bearing units 8 are tapered inwardly, each outer bearing race 14 will be prevented from moving outward relative to its cooperating inner bearing race 18, and each inner bearing race 18 will be prevented from moving inward relative to its cooperating outer bearing race 14. As a result, the bearing units 8 are retained in the desired axial position on the supporting shaft 6, and the sheave 2 is in turn retained in the correct position on the bearing units 8. Any side thrust which may be imposed on the sheave 2 will be absorbed by the roller bearing units 8; the sheave 2 will not slip on the bearings 8 nor will the bearings 8 slip on the shaft 6.

Referring to Fig. 2, reference character 24 designates another typical wire line or rope sheave having a cylindrically shaped hub 26. A pair of tapered roller bearing units 28 are disposed in the hub 26 to support the sheave 24 on a stationary shaft 30. A circumferential groove 32 is provided in the inner surface of the hub 26 in the central portion thereof for receiving a snap ring 34. The snap ring 34 contacts the adjacent ends of the outer rotatable bearing races 36 of the bearing units 28 to prevent the races 36 from moving inwardly relative to the hub 26. The bearing races 36 are tightly fitted in the hub 26.

An annular shaped retaining ring 38 is disposed in each end of the hub 26 in contact with the shaft 30 and the outer end of the adjacent inner stationary bearing race 39 of the bearing unit 28. A plurality of circumferential grooves 40 are provided in the inner periphery of each retaining ring 38 to assist in the retention of lubricant between the retaining rings 38 for the bearing units 28. A tapered circumferential groove 42 is provided in the outer periphery of each retaining ring 38 for receiving the inner tapered ends 44 of a plurality of set screws 46 threadedly secured in the hub 26. The tapered ends 44 of the set screws 46 are adapted to cooperate with the tapered side 48 of the grooves 42 to tighten the bearings 28 through the medium of the retaining rings 38 and the inner bearing races 39.

Circumferential grooves 50 are provided in the shaft 30 adjacent the outer side of each retaining ring 38. A snap ring 52 is disposed in each groove 50 to retain the retaining rings 38 and the inner bearing races 39 in the desired axial position on the shaft 30.

During operation, the retaining rings 38 remain stationary on the shaft 30 and function as grease seals for the bearing units 28. It will be apparent that the snap rings 34 and 52 retain the bearing units 28 and sheave 24 in a predetermined axial position on the shaft 30, and the bearing units 28 will absorb any side thrust that may be imposed on the sheave 24.

From the foregoing it is apparent that the present invention provides a practical and economical method of retaining an idler unit in a predetermined axial position on a supporting shaft. The bearings of the idler unit are removably secured to the shaft, and the idler is in turn removably secured to the bearings to provide a compact construction. Furthermore, the efficiency and service life of idler units will be increased. In addition, the present invention provides a novel combination in an idler unit of a locking apparatus to retain the idler unit bearings and idler unit in a predetermined axial position on a supporting shaft.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In an idler unit rotatably disposed on a stationary shaft, the combination of a pair of roller bearing units for supporting the idler unit on the shaft, a retaining ring in each end of the idler unit hub for tightening the bearing units, each of said retaining rings having a circumferential tapered wall groove in the outer surface thereof, adjusting means carried by the idler unit hub and extending into contact with the walls of said grooves for moving the retaining rings, and means on the shaft adjacent the outer ends of the retaining rings to retain the idler unit in a fixed axial position on the shaft.

2. In an idler unit rotatably disposed on a stationary shaft, the combination of a pair of roller bearing units for supporting the idler unit on the shaft, a retaining ring in each end of the idler unit hub for tightening the bearing units, each of said retaining rings having a circumferential tapered wall groove in the outer surface thereof, a plurality of set screws threadedly secured in each end of the idler unit hub in circumferential spaced relation, said set screws extending into the respective circumferential groove in contact with the inner tapered wall thereof for adjusting the position of the retaining rings, circumferential grooves in the shaft adjacent the outer end of each retaining ring, snap rings in the last mentioned grooves to prevent outward movement of the retaining rings and bearing units, a circumferential groove in the inner surface of the idler unit hub between the bearing units, and a snap ring in the last mentioned groove to prevent inward movement of the bearings and to prevent axial movement of the idler unit on the bearing units.

JESSEE E. FATE, Jr.
WILLIAM H. McKISSICK.

REFERENCES CITED

The following references are of record in the file of this patent:

UNITED STATES PATENTS

| Number | Name | Date |
| --- | --- | --- |
| 1,492,793 | Hansen | May 6, 1924 |
| 2,346,950 | Strehlow | Apr. 18, 1944 |
| 2,512,148 | Gaines | June 20, 1950 |